INVENTOR.
PAUL E. BROKAW
BY
Hoare, Hoare, & Sammon
ATTORNEYS

United States Patent Office 3,543,430
Patented Dec. 1, 1970

3,543,430
FISHING LURE
Paul E. Brokaw, 15500 Lake Shore Blvd.,
Cleveland, Ohio 44110
Filed June 11, 1968, Ser. No. 747,055
Int. Cl. A01k 85/00
U.S. Cl. 43—42.05
10 Claims

ABSTRACT OF THE DISCLOSURE

A fishing lure including an elongated body made from a flexible material having at least one recess aperture therein and a connecting line operably associated with the body for selectively flexing the body along its length. At least one hook is operably connected to the connecting line and is detachably carried in the recess aperture so that when the hook is struck by a fish, the hook will be released from the aperture and drawn outwardly of the body. In one form, a tubular member is angularly disposed through the body to provide a slidable guide for the connecting line.

BACKGROUND OF THE INVENTION

This invention relates to artificial bait, and more particularly relates to a novel and improved construction for a fishing lure which simulates the structure and movement of live bait and which may have the appearance of an earthworm, eel, snake or the like. In the invention, however, it is to be understood that the lure may also simulate other types of live bait, such as hellgrammites, minnows, crawfish, shrimp, frogs, and other analogous types of live bait.

Heretofore, with the great advent in the sport of fishing, many types of artificial lures have been provided for catching various types of fish. Such lures have included flexible bodies which may be agitated or fluttered by means of the fishing line, but have not been entirely satisfactory for many reasons. Such prior lures have generally included a hook permanently embedded in the body section and generally on the underside of the body. This disposition of the hook is not particularly suitable for fish striking the top-side of the lure and has the tendency to move the hook upon flexing of the body. Such body and hook arrangement is not only unsatisfactory from the standpoint of catching fish, but also from the standpoint of being readily susceptible to snagging, particularly under adverse environmental conditions. Such prior lures have also generally required the use of an agitator, spoon shaped element or other means to resist movement in the water which was generally attached to one end of the lure. This arrangement in many cases actually renders the lure ineffective for the reason that when retrieving against the current in swift streams, the lure will have a tendency to curl up and remain in such position, being unable to flex or unflex because of the increased, continuous water force against the face of the agitator. Moreover, the actual simulated movement of the lure will be ineffective under such conditions together with the fact that such ancillary component detracts from the actual appearance of live bait which, of course, do not have any agitator-like members in their anatomy.

SUMMARY OF THE INVENTION

A fishing lure comprising an elongated flexible body having at least one recess-like aperture therein, a connecting line means operably associated with said body adapted for selectively flexing said body along its length upon actuation thereof, and hook means operably connected to said connecting line means adapted to be detachably carried in said recess-like aperture whereby, when said hook means is struck by a fish, the hook means will be released from said aperture and drawn outwardly of said body. In another form, the body includes a tubular member disposed generally interiorly and at an angle adjacent one end of said body adapted to provide a sliding guide for passage of said connecting line means therethrough.

The present invention provides a novel construction for a fishing lure which has many advantages over heretofore known types of lures. The lure of the invention is economical to produce, assemble and is simple, yet of a rugged, durable construction. The lure is made from a flexible and resilient material which may be flexed lengthwise upon actuation of the fishing line to simulate the actual movements of live bait. The body of the lure is provided with a recess-like aperture which is adapted to detachably carry a hook which is disposed generally centrally on the back of the lure which is adapted to be drawn outwardly therefrom and rearwardly of the body of the fish upon the lure being struck so as to hook the fish free of the body of the lure itself, thereby to prevent damage to the lure by the fish. By this arrangement, the hook is detachably connected generally on the back center of the lure wherein it is the optimum ideal position for maximum fish catching while being substantially of a snag-proof construction. In addition, it will be seen that by this arrangement the hook remains substantially stationary irregardless of whether the lure is being flexed or not and hence, is always maintained in proper position in the event the lure is struck by a fish. The lure also incorporates a fail-safe construction so that in the event of a snag, only the hook is lost with the line and lure remain intact for a continuous fishing operation. Moreover, the lure of the present invention enables the angler to easily put on or remove a hook assembly with respect to the lure in the event he desires to have a larger hook or, in the event he cannot remove the hook from the mouth of the fish and finds it necessary to separate the hook from the lure. In addition, the lure of the present invention incorporates a novel antifriction tubular member construction which reduces wear on the fishing line, such as the leader, which would otherwise be damaged by conventional hook or guide eye constructions.

DESCRIPTION OF THE PREFERRED EMBODIMENTS

Figure 1:
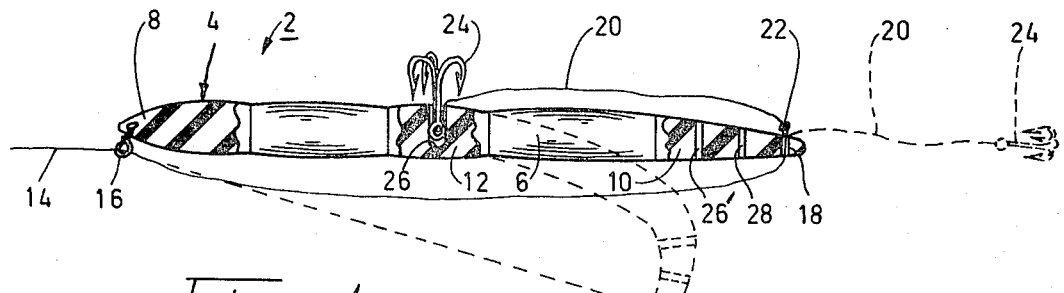
FIG. 1 is a side elevation view, partly in section, showing the fishing lure of the invention in the unflexed (solid line) and in the flexed (broken line) position.

Referring again to the drawings and in particular to FIG. 1 thereof, there is illustrated one form of the fishing lure of the invention, designated generally at 2, which simulates the appearance of an earthworm. As shown, the lure includes an elongated flexible and resilient body 4 made from an elastomeric material, such as rubber, or from a resilient polymeric material, such as a thermoplastic material. Such thermoplastic material may comprise polyvinyl chloride resins and/or copolymers thereof. In addition, various additives and/or pigments may be added to the material to enhance the color characteristics of the lure to simulate the appearance of live bait.

The flexible body 4 includes a middle section 6, a forward section 8 and a rear section 10 which are integrally joined together to provide a unitary elongated body structure. The central section 6 is provided with a middle segment or portion 12 which is generally disposed an equal distance between the opposed ends of the body 4. In the invention the forward section 8, rear section 10 and the middle portion 12 are made of a relatively less flexible material, as compared to the material of the remainder of the middle section 6. Preferably, the sections 8 and 10 and the portion 12 are made from a polymeric material having a durometer in the range between about 20 to 35 while the remaining material of the central section 6 has a durometer in the range between about 10 to 15 and up to a durometer of 20.

In the form shown, a fishing line 14 is trained through an eye or hook 16 secured adjacent the forward section 8 and extends generally longitudinally of the body 4 and through one of a series, such as 18, 26' and 28, passageways which extend generally perpendicular to the longitudinal central axis of the body 4. These passageways are disposed in the rear section 10 and provide an effective mechanism for varying the disposition of the fishing line 14 with respect to the lure body 4. The fishing line 14 which may be a relatively heavy leader, such as a ten pound test line, passes through the passageway 18 and includes a relatively lighter terminal extending leader 20, such as a four pound test line, which is connected to a suitable hook 24, such as the treble hook shown. At the juncture of connection between the leader 20 and the leader 14 a suitable stop means 22, such as an apertured disk or the like, may be fixedly attached to the line to prevent the leader 20 from being drawn through the passageway 18 upon actuation of the leader 14.

In accordance with the invention, the middle portion 12 is provided with a generally U-shaped recess-like aperture 26 which is disposed substantially centrally thereof and which extends upwardly and opens onto the back or top side of the lure body 4. This aperture 26 may be formed in the material of the lure body 4 by suitable forming techniques as known in the art. The aperture 26 preferably has a transverse cross sectional dimension slightly less than that of the eye, such as 42, FIG. 3, on the hook 24 so as to slidably yet resiliently and frictionally hold the hook in secured relation interiorly of the lure body.

In operation of the lure, the angler may apply a slight jerking movement to the fishing line 14 so as to impart a flexing action to the lure body, as shown in dotted line. This movement results in the lure body flexing longitudinally with respect to its lengthwise dimension. This action imparts an extremely live action to the lure so as to simulate the movement of a live bait, and in this case, such as an earthworm. During this flexing action, the hook 24 remains relatively stationary being disposed at the back center of the lure body. When the lure is struck by a fish (not shown), the hook 24 is drawn outwardly and rearwardly of the lure body (broken-line) so as to trail behind the lure to retain the hooked fish in spaced relation rearwardly away from the lure so as not to damage the same by its teeth. Here again, it will be seen that the stop means 22 acts to provide a predetermined spaced relationship of the leader 20 and hence, the hooked fish with respect to the lure body. Accordingly, it will be seen that the hook 24 is carried in an upstanding generally perpendicular position with respect to the longitudinal central axis of the lure body where it is readily available at all times to be struck by a fish. When the lure is initially struck the lure body 4 may have a tendency to ride-up the fishing line 14 as the leader 20 and hook 24 are drawn outwardly and rearwardly by the fish. Generally, however, the lure body 4 will remain relatively stationary with respect to the leader 20 and hook 24 when struck by a fish due to the force of the current and/or relative movement of the lure through the water.

Figure 2:
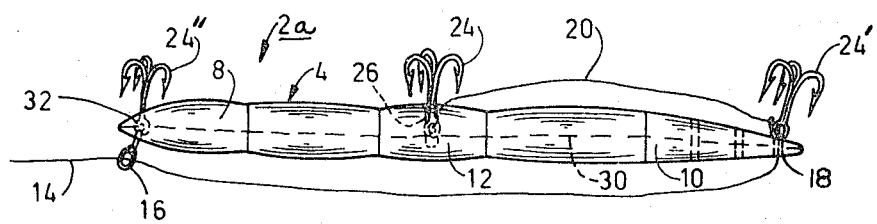
FIG. 2 is a side elevation view showing another form of the fishing lure of the invention.

In FIG. 2 there is shown another modified form of the lure, designated generally at 2a, including an elongated body 4 having forward 8, rear 10, and a middle section 12. In this form, the fishing line 14 is trained through a forward eyelet 16 and through a passageway 18 in the rear section 10. Hereagain, the leader 20 is attached to a hook 24 carried within the recess aperture 26. In this form, however, a second hook 24' is attached to the leader 20 adjacent its connection with the leader 14 and a third hook 24" is attached adjacent the front section 8. In this form, the lure body 4 is provided with an interiorly extending resilient reinforcement member 30, such as a resilient wire or the like, which extends between the opposed distal ends of the lure body. By this arrangement, the forward hook 24" may be attached, as at 32, to the reinforcement member 30 while the rear hook 24' may also be attached to such reinforcement member 30. This arrangement provides efficient flexibility in the lure body while providing optimum strength characteristics for mounting the hooks in a permanent relationship with respect to the lure body.

Figure 3:
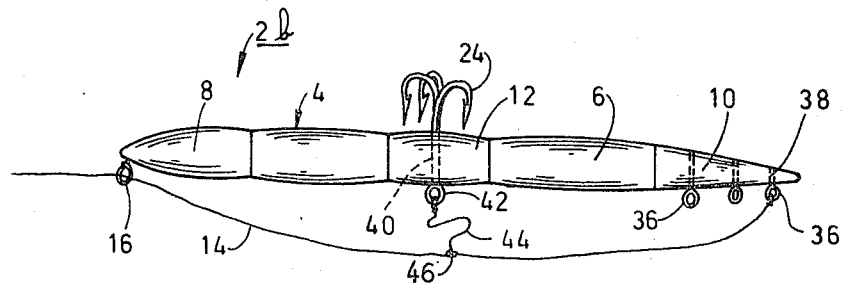
FIG. 3 is a side elevation view of a further form of the fishing lure of the invention.

In FIG. 3 there is shown another modified form of the fishing lure, designated generally at 2b, including an elongated flexible body 4 having forward 8, central 6 and rear 10 sections. In this form, however, the fishing line 14 is trained through the forward eyelet 16 and fixedly attached at its terminal end to one of a series of axially spaced rear eyelets 36 which are embedded, as at 38, in the material of the rear section 10. Moreover, this disposition of the eyelets 36 provides an effective adjustment of the fishing line 14 with respect to the lengthwise dimension of the lure body. In this form, the hook 24 is centered on the top or back side of the lure body and extends through an aperture 40 provided in the middle portion 12 of the body. As shown, the eye 42 of the hook 24 is disposed exteriorly on the belly or underside of the lure so as to be readily accessible for connection of the hook to the fishing line 14. In the form shown, this connection is achieved by means of an intermediate relatively short leader 44 which is fixedly attached, as at 46, to the fishing line 14 at a point generally centrally between the forward eyelet 16 and the rearwardmost of the rear eyelet 36. Hereagain, a flexing action may be imparted to the lure body 4 upon actuation of the fishing line 14 while the hook 24 is carried within the recess aperture 40 for movement outwardly and away from the lure body upon being struck by a fish.

Figure 4:
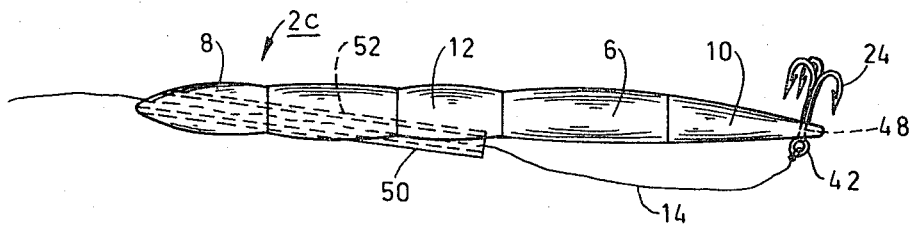
FIG. 4 is another modified form of the fishing lure of the invention.

In FIG. 4 there is shown a further modified form of the fishing lure, designated generally at 2c, wherein the body includes forward 8, central 6 and rear sections 10 with the rear section 10 carrying a hook 24 which is embedded within an aperture 48 in the material of the section 10. In this form, however, a tubular member 50, such as an elongated cylindrical metal or plastic tube, is disposed interiorly and angularly with respect to the longitudinal central axis of the lure body. In the form shown, the tubular member 50 extends angularly, upwardly and outwardly from the middle portion 12 toward the forward section 8 so as to receive in slidable relation the fishing line 14 therethrough. The fishing line 14 is connected at its terminal end to the eye 42 of the hook 24. The tubular member 50 may be disposed through a correspondingly inclined passageway 52 which may be preformed in the material of the lure body. However, the tubular member 50 may be molded in situ in the material of the lure during fabrication thereof. This arrangement provides an effective anti-friction mechanism so as to reduce wear and/or damage to the fishing line or leader 14 during use of the lure. The tubular member commences flush with the forward section 8 and may extend slightly exteriorly at its other end adjacent the belly or underside of the lure so that a portion is exposed to insure smooth sliding action of the fishing line 14 through the tubular member 50.

I claim:

1. A fishing lure comprising,
an elongated body made from a flexible material,
said body having a forward portion, a middle portion, a rearward portion all integrally joined together and defining a generally top-side and underside for said body,
a first fish hook fixedly attached to said body adjacent the forwardmost end of said forward portion and extending outwardly from said top-side and having eye-like means projecting outwardly from said underside,
a second fish hook positioned adjacent the rearwardmost end of said rearward portion and extending outwardly from said top-side and having eye-like means projecting outwardly from said top-side,
a connecting line slidably disposed through the eye-like means of said first fish hook and extending rearwardly along the underside of said body and through a passageway in the rearward portion thereof and being fixedly attached to the eye-like means of said second fish hook and adapted to selectively flex said body along its length for moving the rearward portion of said body toward and away from the forward portion of said body upon actuation thereof.

2. A fishing lure in accordance with claim 1, wherein said middle portion includes a recess-like aperture therein,
a third fish hook releasably carried in said recess-like aperture, and
said connecting line connecting said third fish hook to said second fish hook whereby when said third fish hook is struck by a fish, the third fish hook will be released from said aperture and drawn outwardly of said body.

3. A fishing lure in accordance with claim 2, wherein said third fish hook includes eye-like means detachably carried in said recess-like aperture, and
the transverse cross sectional dimension of said aperture being less than that of said eye-like means of said third fish hook to frictionally and releasably hold the same in secured relation with said body until struck by a fish.

4. A fishing lure in accordance with claim 2, wherein said third fish hook is carried in a generally vertically oriented relation with respect to the longitudinal central axis of said body, and
said third fish hook extends outwardly in a direction from the top-side of said body.

5. A fishing lure in accordance with claim 1, wherein the eye-like means of said first fish hook acts as a stop for said second fish hook upon the flexing movement of said body.

6. A fishing lure in accordance with claim 1, wherein said body is made from a flexible plastic material.

7. A fishing lure in accordance with claim 1, wherein said body is made from a flexible rubber material.

8. A fishing lure in accordance with claim 1, wherein said middle portion includes a recess-like aperture therein,
said aperture terminating short of the underside of said body and opening outwardly onto the top-side of said body,
a third fish hook carried in upstanding relation within said aperture and extending outwardly away from the top-side of said body, and
another connecting line connecting said third fish hook to said second fish hook along the top-side of said body.

9. A fishing lure in accordance with claim 8, wherein said third fish hook includes eye-like means disposed within said aperture, and
said other connecting line attached at one end to the eye-like means of said third fish hook and connected at its other end to the eye-like means of said second fish hook.

10. A fishing lure in accordance with claim 1, wherein said body includes a plurality of longitudinally spaced passageways disposed in the rearward portion of said body adapted for selectively adjusting the connecting line lengthwise of said body.

References Cited

UNITED STATES PATENTS

| | | | |
|---|---|---|---|
| 1,863,125 | 6/1932 | Powell | 43—42.04 |
| 2,236,353 | 3/1941 | Minser | 43—42.05 |
| 2,290,433 | 7/1942 | Jeffers | 43—42.02 X |
| 2,690,026 | 9/1954 | King | 43—42.02 |
| 2,770,063 | 11/1956 | Martin | 43—42.02 |
| 2,892,281 | 6/1959 | Schilling et al. | 43—42.36 |
| 2,912,784 | 11/1959 | Carlin | 43—42.24 X |
| 3,205,608 | 9/1965 | Dickinson | 43—42.05 X |

WARNER H. CAMP, Primary Examiner

U.S. Cl. X.R.

43—42.02, 42.24